(12) United States Patent
Guo et al.

(10) Patent No.: US 10,591,981 B2
(45) Date of Patent: Mar. 17, 2020

(54) TERMINAL CONTROL METHOD AND APPARATUS, AND TERMINAL

(71) Applicant: Huawei Technologies Co., Ltd., Shenzhen, Guangdong (CN)

(72) Inventors: Yuhua Guo, Shanghai (CN); Jiesi Li, Shanghai (CN); Huanhuan Jing, Shanghai (CN); Changfeng Zhou, Shanghai (CN); Tengfei Mu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 144 days.

(21) Appl. No.: 15/566,627

(22) PCT Filed: Apr. 14, 2015

(86) PCT No.: PCT/CN2015/076512
§ 371 (c)(1),
(2) Date: Oct. 13, 2017

(87) PCT Pub. No.: WO2016/165062
PCT Pub. Date: Oct. 20, 2016

(65) Prior Publication Data
US 2018/0095518 A1    Apr. 5, 2018

(51) Int. Cl.
*G06F 1/32* (2019.01)
*G06F 1/3287* (2019.01)
(Continued)

(52) U.S. Cl.
CPC .......... *G06F 1/3287* (2013.01); *G06F 1/3206* (2013.01); *G06F 1/329* (2013.01);
(Continued)

(58) Field of Classification Search
CPC .......... G06F 1/3278; H04W 52/0264
See application file for complete search history.

(56) References Cited

U.S. PATENT DOCUMENTS

2007/0220291 A1   9/2007   Stufflebeam
2009/0011791 A1   1/2009   Tashiro
(Continued)

FOREIGN PATENT DOCUMENTS

CN   101395894 A   3/2009
CN   101754458 A   6/2010
(Continued)

OTHER PUBLICATIONS

Office Action issued in Japanese Application No. 2017-553314 dated Jul. 23, 2019, 1 page.
(Continued)

*Primary Examiner* — Albert Wang
(74) *Attorney, Agent, or Firm* — Fish & Richardson P.C.

(57) ABSTRACT

Embodiments of the present invention provide a terminal control method and apparatus, and a terminal. The method includes: when a screen of a terminal is switched from a screen-on state to a screen-off state, detecting whether an enabling condition of a power saving mode is satisfied; and if the enabling condition of the power saving mode is satisfied, performing a power saving operation, where the power saving operation is used to reduce power consumption that occurs when an application program in the terminal runs in a background. In the embodiments of the present invention, power consumption in a screen-off state is reduced as much as possible without affecting normal use of a user.

20 Claims, 9 Drawing Sheets

(51) Int. Cl.
*H04M 1/73* (2006.01)
*H04W 52/02* (2009.01)
*G06F 1/3206* (2019.01)
*G06F 1/3234* (2019.01)
*G06F 1/329* (2019.01)

(52) U.S. Cl.
CPC ............ *G06F 1/3234* (2013.01); *H04M 1/73* (2013.01); *H04W 52/0251* (2013.01); *H04W 52/0264* (2013.01); *H04W 52/0267* (2013.01); *H04W 52/0277* (2013.01); *Y02D 10/171* (2018.01); *Y02D 10/24* (2018.01); *Y02D 70/00* (2018.01); *Y02D 70/1222* (2018.01); *Y02D 70/1224* (2018.01); *Y02D 70/1262* (2018.01); *Y02D 70/142* (2018.01); *Y02D 70/144* (2018.01)

(56) References Cited

U.S. PATENT DOCUMENTS

| | | |
|---|---|---|
| 2010/0231383 A1 | 9/2010 | Levine et al. |
| 2011/0098080 A1 | 4/2011 | Kuo |
| 2013/0332589 A1* | 12/2013 | Zhong ..................... G06F 9/46 709/223 |
| 2014/0075220 A1 | 3/2014 | Song |
| 2015/0257108 A1 | 9/2015 | Hara et al. |
| 2016/0209907 A1 | 7/2016 | Han et al. |

FOREIGN PATENT DOCUMENTS

| | | |
|---|---|---|
| CN | 101917516 A | 12/2010 |
| CN | 102012735 A | 4/2011 |
| CN | 102044201 A | 5/2011 |
| CN | 102045891 A | 5/2011 |
| CN | 103002163 A | 3/2013 |
| CN | 103105920 A | 5/2013 |
| CN | 103260205 A | 8/2013 |
| CN | 103442148 A | 12/2013 |
| CN | 103533184 A | 1/2014 |
| CN | 103593039 A | 2/2014 |
| CN | 104065835 A | 9/2014 |
| CN | 104298336 A | 1/2015 |
| CN | 104298547 A | 1/2015 |
| CN | 104486510 A | 4/2015 |
| CN | 105474129 A | 4/2016 |
| EP | 3037913 A1 | 6/2016 |
| JP | 2009118536 A | 5/2009 |
| JP | 2013-106159 A | 5/2013 |
| JP | 2015012599 A | 1/2015 |
| JP | 2016-530819 A | 9/2016 |
| KR | 10-2015-0022237 A | 3/2015 |
| KR | 10-2015-0033505 A | 4/2015 |
| RU | 2436144 C2 | 12/2011 |
| WO | 2014083676 A1 | 6/2014 |
| WO | 2015003601 A1 | 1/2015 |
| WO | 2015007244 A1 | 1/2015 |
| WO | 2015026197 A1 | 2/2015 |

OTHER PUBLICATIONS

Office Action issued in Chinese Application No. 201580014456.6 dated Oct. 17, 2019, 7 pages (with English translation).

* cited by examiner

TERMINAL CONTROL METHOD AND APPARATUS, AND TERMINAL

CROSS-REFERENCE TO RELATED APPLICATIONS

This application is a National Stage of International Application No. PCT/CN2015/076512, filed on Apr. 14, 2015, which is hereby incorporated by reference in its entirety.

TECHNICAL FIELD

Embodiments of the present invention relate to the field of power supply management, and in particular, to a terminal control method and apparatus, and a terminal.

BACKGROUND

Terminals such as smartphones, tablet computers or ebook readers have become an essential part in daily lives of users.

All these terminals are powered by using rechargeable batteries. Because batteries have limited capacities, the terminals are generally provided with power saving modes. A power saving mode provided in the prior art is as follows: A terminal detects a remaining amount of electricity of a battery. When the remaining amount of electricity is less than a preset threshold, brightness of a screen is turned down to preset brightness, so as to reduce power consumption of the screen.

A screen is one of the most power-consuming components of a terminal. Therefore, in a current power saving mode, an objective of power saving is mainly achieved by turning down brightness of a screen or turning off a screen in time. However, these power saving modes cannot alleviate a power consumption problem that occurs after the screen of the terminal is turned off.

SUMMARY

Embodiments of the present invention provide a terminal control method and apparatus, and a terminal, to reduce power consumption after a screen of the terminal is turned off.

According to a first aspect, a terminal control method is provided, where the method includes:

when a screen of a terminal is switched from a screen-on state to a screen-off state, detecting whether an enabling condition of a power saving mode is satisfied; and if the enabling condition of the power saving mode is satisfied, performing a power saving operation, where the power saving operation is used to reduce power consumption that occurs when an application program in the terminal runs in a background.

In a first possible implementation manner of the first aspect, the performing a power saving operation includes performing at least one of the following operations:

stopping a first-type application program;

disconnecting a network connection of a second-type application program;

pausing a timer of a third-type application program; or switching from an initial network switching mode to a target network switching mode, where a network mode used in the target network switching mode does not include a network mode in which signal quality is lower than expected quality.

With reference to the first possible implementation manner of the first aspect, in a second possible implementation manner, after the stopping a first-type application program, the method further includes:

prohibiting automatic start of the stopped first-type application program.

With reference to the first possible implementation manner or the second possible implementation manner of the first aspect, in a third possible implementation manner, the stopping a first-type application program includes:

after the screen-off state lasts for a first time period, searching for the first-type application program, where the first-type application program is an application program that is in a running state and that has not performed a network-connecting operation within the first time period; and stopping the found first-type application program.

With reference to any one of the first to the third possible implementation manners of the first aspect, in a fourth possible implementation manner, the disconnecting a [[data]]network connection of a second-type application program includes:

after the screen-off state lasts for a second time period, searching for the second-type application program, where the second-type application program is an application program that is in a running state and that is not performing a network-connecting operation at a current moment; and disconnecting the network connection of the found second-type application program.

With reference to any one of the first to the fourth possible implementation manners of the first aspect, in a fifth possible implementation manner, the pausing a timer of a third-type application program includes:

intercepting the timer set by the third-type application program, where the third-type application program is an application program that is in a running state; and saving the timer to a pause linked list.

With reference to the second possible implementation manner of the first aspect, in a sixth possible implementation manner, the prohibiting automatic start of the stopped first-type application program includes:

setting an allowRestart parameter corresponding to the stopped first-type application program to no, so as to prohibit an automatic start mechanism of an operating system from starting the first-type application program; and/or intercepting a broadcast message sent to the stopped first-type application program, so as to prohibit the broadcast message from triggering the first-type application program to start.

With reference to any one of the first to the sixth possible implementation manners of the first aspect, in a seventh possible implementation manner, the first-type application program is an application program that does not belong to a protection list;

the second-type application program is an application program that does not belong to the protection list; and the third-type application program is an application program that does not belong to the protection list.

With reference to the first aspect or any one of the possible implementation manners of the first aspect, in an eighth possible implementation manner of the first aspect, the when a screen of a terminal is switched from a screen-on state to a screen-off state, detecting whether an enabling condition of a power saving mode is satisfied includes:

when the screen of the terminal is switched from the screen-on state to the screen-off state, detecting whether the power saving mode is in an enabled state; or when the screen of the terminal is switched from the screen-on state to the screen-off state, detecting whether the power saving mode is in an enabled state and whether a current time period is within a rest time period of a user.

With reference to the first aspect or any one of the possible implementation manners of the first aspect, in a ninth possible implementation manner of the first aspect, the method further includes:

when the screen of the terminal is switched from the screen-off state to the screen-on state, canceling performing the power saving operation in the power saving mode.

According to a second aspect, a terminal control apparatus is provided, where the apparatus includes:

a detection module, configured to: when a screen of a terminal is switched from a screen-on state to a screen-off state, detect whether an enabling condition of a power saving mode is satisfied; and an execution module, configured to: if a detection result of the detection module is that the enabling condition of the power saving mode is satisfied, perform a power saving operation, where the power saving operation is used to reduce power consumption that occurs when an application program in the terminal runs in a background.

In a first possible implementation manner of the second aspect, the execution module includes at least one of the following units:

a stopping unit, configured to stop a first-type application program;

a disconnection unit, configured to disconnect a network connection of a second-type application program;

a pausing unit, configured to pause a timer of a third-type application program; or a switching unit, configured to switch from an initial network switching mode to a target network switching mode, where a network mode used in the target network switching mode does not include a network mode in which signal quality is lower than expected quality.

With reference to the first possible implementation manner of the second aspect, in a second possible implementation manner, the execution module further includes:

a restart prohibition unit, configured to prohibit automatic start of the stopped first-type application program.

With reference to the second aspect or the second possible implementation manner of the second aspect, in a third possible implementation manner, the stopping unit is configured to: after the screen-off state lasts for a first time period, search for the first-type application program, where the first-type application program is an application program that is in a running state, that does not belong to a protection list, and that has not performed a network-connecting operation within the first time period; and stop the found first-type application program.

With reference to any one of the first to the third possible implementation manners of the second aspect, in a fourth possible implementation manner, the disconnection unit is specifically configured to: after the screen-off state lasts for a second time period, search for the second-type application program, where the second-type application program is an application program that is in a running state, that does not belong to the protection list, and that is not performing a network-connecting operation at a current moment; and disconnect the network connection of the found second-type application program.

With reference to any one of the first to the fourth possible implementation manners of the second aspect, in a fifth possible implementation manner, the pausing unit is specifically configured to: intercept the timer set by the third-type application program, where the third-type application program is an application program that is in a running state and that does not belong to the protection list; and save the timer to a pause linked list.

With reference to the second possible implementation manner of the second aspect, in a sixth possible implementation manner, the restart prohibition unit is specifically configured to: set an allowRestart parameter corresponding to the stopped first-type application program to no, so as to prohibit an automatic start mechanism of an operating system from starting the first-type application program; and/or intercept a broadcast message sent to the stopped first-type application program, so as to prohibit the broadcast message from triggering the first-type application program to start.

With reference to any one of the first to the sixth possible implementation manners of the second aspect, in a seventh possible implementation manner, the first-type application program is an application program that does not belong to a protection list;

the second-type application program is an application program that does not belong to the protection list; and the third-type application program is an application program that does not belong to the protection list.

With reference to the second aspect or any one of the possible implementation manners of the second aspect, in an eighth possible implementation manner of the second aspect, the detection module is specifically configured to: when the screen of the terminal is switched from the screen-on state to the screen-off state, detect whether the power saving mode is in an enabled state; or the detection module is specifically configured to: when the screen of the terminal is switched from the screen-on state to the screen-off state, detect whether the power saving mode is in an enabled state and whether a current time period is within a rest time period of a user.

With reference to the second aspect or any one of the possible implementation manners of the second aspect, in a ninth possible implementation manner of the second aspect, the apparatus further includes:

a cancelation module, configured to: when the screen of the terminal of the execution module is switched from the screen-off state to the screen-on state, cancel performing the power saving operation in the power saving mode.

According to a third aspect, a terminal is provided, where the terminal includes:

a processor; and a memory and a screen that are electrically connected to the processor, where the memory stores one or more instructions, and the one or more instructions are configured to be performed by the processor;

the processor is configured to: when the screen is switched from a screen-on state to a screen-off state, detect whether an enabling condition of a power saving mode is satisfied; and the processor is further configured to: if the enabling condition of the power saving mode is satisfied, perform a power saving operation, where the power saving operation is used to reduce power consumption that occurs when an application program in the terminal runs in a background.

In a first possible implementation manner of the third aspect, when performing the power saving operation, the processor is specifically configured to perform at least one of the following operations:

stopping a first-type application program;

disconnecting a network connection of a second-type application program;

pausing a timer of a third-type application program; or switching from an initial network switching mode to a target network switching mode, where a network mode used in the target network switching mode does not include a network mode in which signal quality is lower than expected quality.

With reference to the first possible implementation manner of the third aspect, in a second possible implementation manner of the third aspect, the processor is further configured to: after stopping the first-type application program, prohibit automatic start of the stopped first-type application program.

With reference to the first possible implementation manner or the second possible implementation manner of the third aspect, in a third possible implementation manner of the third aspect, when stopping the first-type application program, the processor is specifically configured to: after the screen-off state lasts for a first time period, search for the first-type application program, where the first-type application program is an application program that is in a running state and that has not performed a network-connecting operation within the first time period; and stop the found first-type application program.

With reference to any one of the first to the third possible implementation manners of the third aspect, in a fourth possible implementation manner of the third aspect, when disconnecting the [[data]]network connection of the second-type application program, the processor is specifically configured to: after the screen-off state lasts for a second time period, search for the second-type application program, where the second-type application program is an application program that is in a running state and that is not performing a network-connecting operation at a current moment; and disconnect the network connection of the found second-type application program.

With reference to any one of the first to the fourth possible implementation manners of the third aspect, in a fifth possible implementation manner of the third aspect, when pausing the timer of the third-type application program, the processor is specifically configured to: intercept the timer set by the third-type application program, where the third-type application program is an application program that is in a running state and that does not belong to a protection list; and save the timer to a pause linked list.

With reference to the second possible implementation manner of the third aspect, in a sixth possible implementation manner of the third aspect, when prohibiting the automatic start of the stopped first-type application program, the processor is specifically configured to: set an allowRestart parameter corresponding to the stopped first-type application program to no, so as to prohibit an automatic start mechanism of an operating system from starting the first-type application program; and/or intercept a broadcast message sent to the stopped first-type application program, so as to prohibit the broadcast message from triggering the first-type application program to start.

With reference to any one of the first to the sixth possible implementation manners of the third aspect, in a seventh possible implementation manner of the third aspect, the first-type application program is an application program that does not belong to a protection list;

the second-type application program is an application program that does not belong to the protection list; and the third-type application program is an application program that does not belong to the protection list.

With reference to the third aspect or any one of the possible implementation manners of the third aspect, in an eighth possible implementation manner of the third aspect, when the screen of the terminal is switched from the screen-on state to the screen-off state and the processor detects whether the enabling condition of the power saving mode is satisfied, the processor is specifically configured to:

when the screen of the terminal is switched from the screen-on state to the screen-off state, detect whether the power saving mode is in an enabled state; or when the screen of the terminal is switched from the screen-on state to the screen-off state, detect whether the power saving mode is in an enabled state and whether a current time period is within a rest time period of a user.

With reference to the third aspect or any one of the possible implementation manners of the third aspect, in a ninth possible implementation manner of the third aspect, after performing the power saving operation, the processor is further configured to: when the screen of the terminal is switched from the screen-off state to the screen-on state, cancel performing the power saving operation.

When a screen of a terminal is switched from a screen-on state to a screen-off state, a power saving operation is performed, to reduce power consumption that occurs when an application program in the terminal runs in a background, and reduce power consumption in the screen-off state as much as possible without affecting normal use of a user.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer, the following further describes the embodiments of the present invention in detail with reference to the accompanying drawings.

The terminal mentioned herein may be a mobile phone, a tablet computer, an ebook reader, a moving picture experts group audio layer 3 (MP3), a moving picture experts group audio layer 4 (MP4), a portable laptop computer, or the like. The terminal mentioned herein may be a terminal that is powered by using a battery.

An application program herein generally refers to an application program, a process, a thread, a service, or the like.

Figure 1:
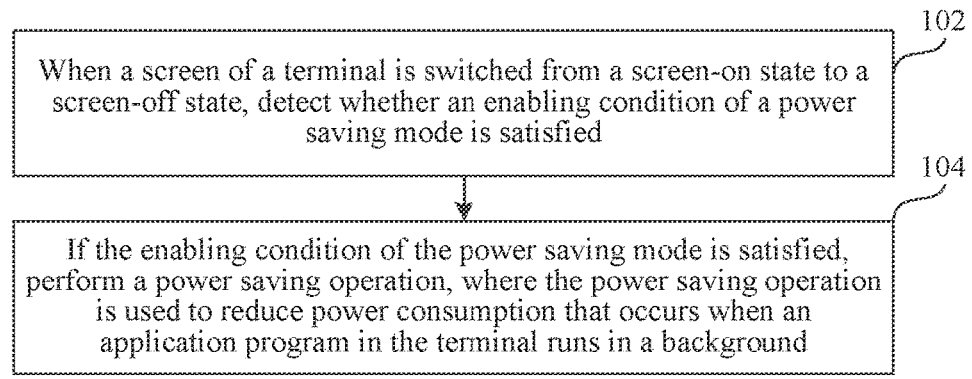
FIG. 1 is a flowchart of a terminal control method according to an embodiment of the present invention.

Referring to FIG. 1, FIG. 1 is a flowchart of a terminal control method according to an embodiment of the present invention. In this embodiment, an example in which the terminal control method is applied to a terminal is used for description. The method includes the following steps.

Step 102: When a screen of a terminal is switched from a screen-on state to a screen-off state, detect whether an enabling condition of a power saving mode is satisfied.

Step 104: If the enabling condition of the power saving mode is satisfied, perform a power saving operation, where the power saving operation is used to reduce power consumption that occurs when an application program in the terminal runs in a background.

The power saving mode includes at least one type of power saving operations. The power saving operations are used to reduce power consumption that occurs when an application program in the terminal runs in the background.

The power consumption that occurs when an application program runs in the background may include: an amount of electricity consumed when the application program is run by a processor, and an amount of electricity consumed when the application program receives and sends a radio signal when the application program connects to a network. Network connection refers to that the application program accesses the Internet by using a data network of a terminal.

In conclusion, according to the terminal control method provided in this embodiment, when a screen of a terminal is in a screen-off state, a power saving operation in a power saving mode is performed, so as to reduce power consumption that occurs when an application program in a terminal runs in a background, thereby resolving that in a current power saving mode, a power saving policy is mainly turning down brightness of a screen or turning off a screen in time, but these power saving modes cannot alleviate a power consumption problem that occurs after the screen of the terminal is turned off. Therefore, power consumption in the screen-off state is reduced as much as possible without affecting normal use of a user.

Figure 2:
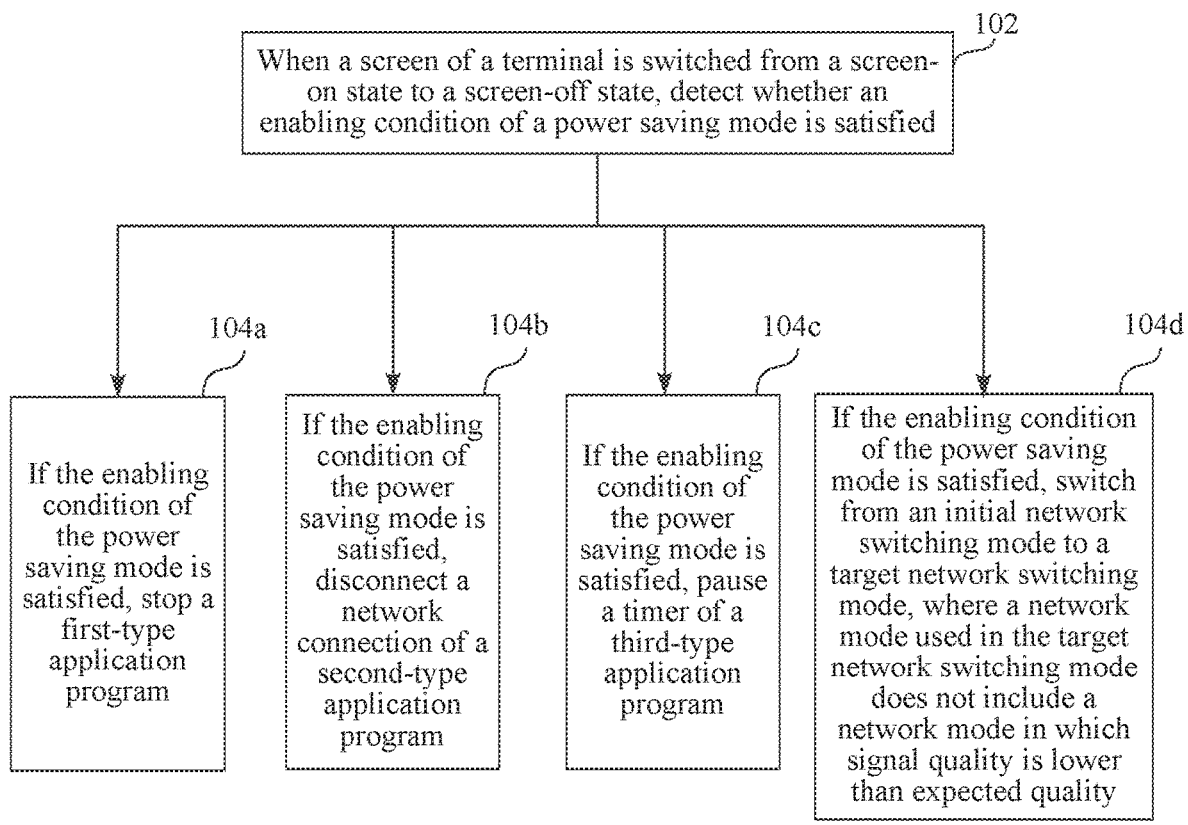
FIG. 2 is a flowchart of a terminal control method according to another embodiment of the present invention.

In a possible embodiment, step 104 in the embodiment shown in FIG. 1 may include at least one of step 104*a* to step 104*d*, as shown in FIG. 2:

Step 104*a*: Stop a first-type application program.

The first-type application program is an application program that does not need to maintain a running state after a screen is turned off.

Step 104*b*: Disconnect a network connection of a second-type application program.

The second-type application program is an application program that needs to maintain a running state but does not need a network connection after the screen is turned off.

Step 104*c*: Pause a timer of a third-type application program.

The third-type application program is an application program that needs to maintain a running state and that may need a network connection but does not need to maintain a heartbeat signal with a server or does not need to periodically detect a new version after the screen is turned off. Maintaining of the heartbeat signal with the server or periodical detection of a new version is usually implemented by the application program applying for the timer from an operating system.

Step 104*d*: Switch from an initial network switching mode to a target network switching mode, where a network mode used in the target network switching mode does not include a network mode in which signal quality is lower than expected quality.

The terminal performs switching, according to a policy related to signal quality, between various types of network modes, for example, a second-generation mobile communications network (2G), a third-generation mobile communications network (3G), and a fourth-generation mobile communications network (4G). In an actual environment, signal quality of a network mode is lower than expected quality. For example, at an initial stage of construction of a 4G network, signal quality of the 4G network is generally relatively poor. If the terminal frequently performs switching between a 2G/3G network and the 4G network, a large amount of electricity is consumed.

Therefore, in the power saving mode, the terminal enters the target network switching mode, where a network mode used in the target network switching mode during switching does not include a network mode in which signal quality is lower than expected quality. For example, the target network switching mode is a switching mode of performing switching between a 2G network and a 3G network according to a policy related to signal quality, and the network mode used in the target network switching mode includes only the 2G network and the 3G network, but does not include a 4G network.

In conclusion, according to the terminal control method provided in this embodiment, an amount of electricity consumed when an application program that does not need to run after a screen is turned off is run by a processor may be reduced by means of step 104*a*, and an amount of electricity consumed when a background application program receives and sends a radio signal when a network is connected may be reduced by means of step 104*b*, step 104*c*, and step 104*d*.

Figure 3:
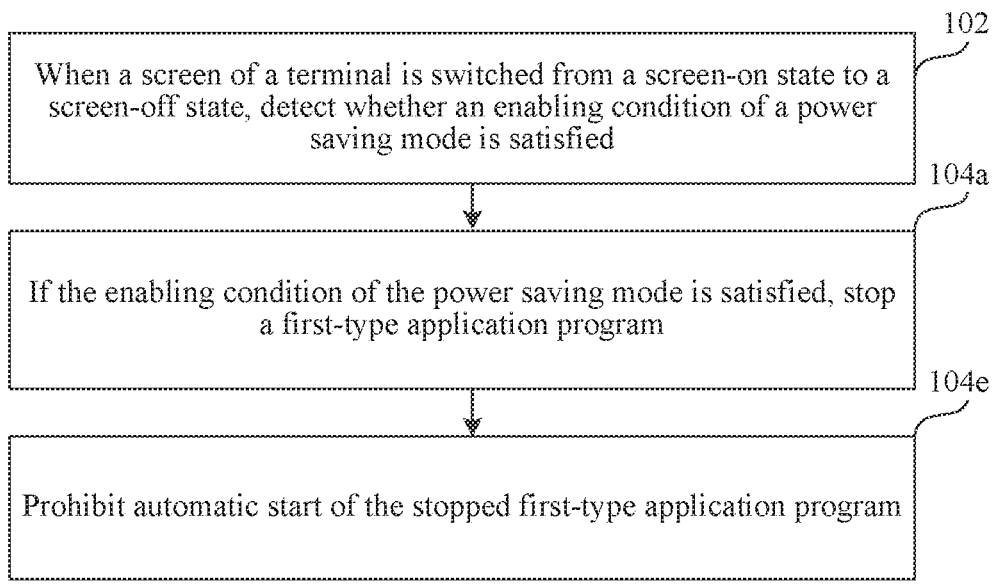
FIG. 3 is a flowchart of a terminal control method according to another embodiment of the present invention.

In another possible embodiment, when step 104 in the embodiment shown in FIG. 1 includes step 104*a*, step 104 may optionally include step 104*e*, as shown in FIG. 3:

Step 104*e*: Prohibit automatic start of the stopped first-type application program.

The stopped application program may be restarted by some automatic start mechanisms of the operating system. In the power saving mode, the terminal needs to prohibit the automatic start of the stopped first-type application program. The automatic start refers to a start mode that does not involve manual start by a user.

In conclusion, by means of the terminal power-saving method provided in this embodiment, an amount of electricity consumed when an application program that does not need to run after a screen is turned off is run by a processor may further be reduced.

Figure 4:
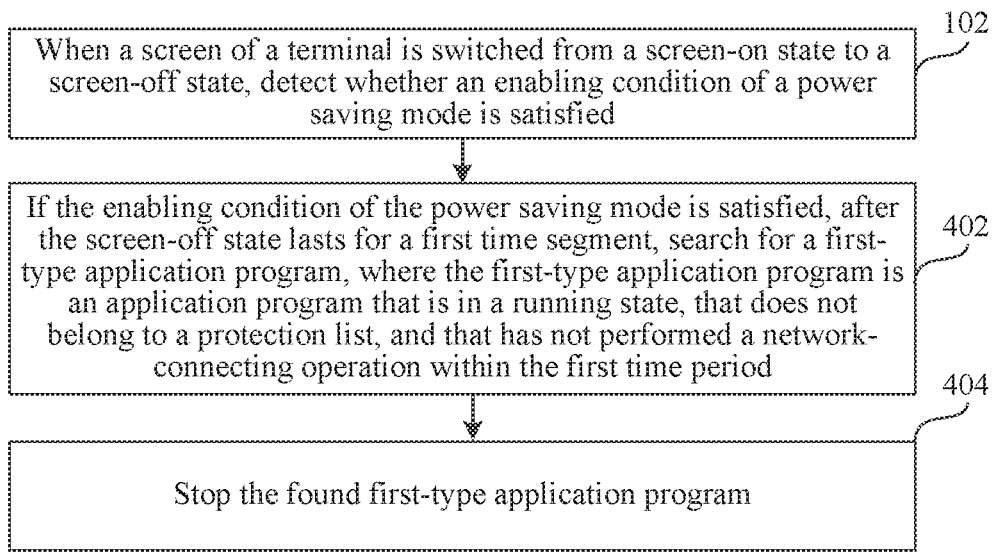
FIG. 4 is a flowchart of a terminal control method according to another embodiment of the present invention.

In another possible embodiment, step 104a in the embodiment shown in FIG. 2 may be replaced with step 402 and step 404, as shown in FIG. 4:

Step 402: After the screen-off state lasts for a first time period, search for a first-type application program, where the first-type application program is an application program that is in a running state and that has not performed a network-connecting operation within the first time period.

The first time period may be one minute.

In this embodiment, if an application program has not performed any network-connecting operation within one minute after a screen is turned off, it is considered that the application program is an application program that does not need to maintain a running state after the screen is turned off. After the screen-off state lasts for one minute, a terminal finds these application programs as first-type application programs.

Optionally, the first-type application program is also an application program that does not belong to a protection list. The protection list is preset by a system or is defined by a user. An application program such as a basic application program or a communications application of an operating system usually belongs to the protection list.

Step 404: Stop the found first-type application program.

The terminal stops the found first-type application program.

In conclusion, compared with that all application programs that do not belong to a protection list are used as first-type application programs, in this embodiment, an application program that has not performed a network-connecting operation within a first time period is used as the first-type application program, so that an application program that is performing an effective operation such as data synchronization and data backup after a screen is turned off can be prevented from being inappropriately stopped. After a user finishes using a terminal and manually makes the terminal enter a screen-off mode, a latest application program used by the user may still perform data interaction with a server. Therefore, a manner of determining a first-type application program in this embodiment is more appropriate, which reduces a probability of incorrectly stopping an application program.

Figure 5:
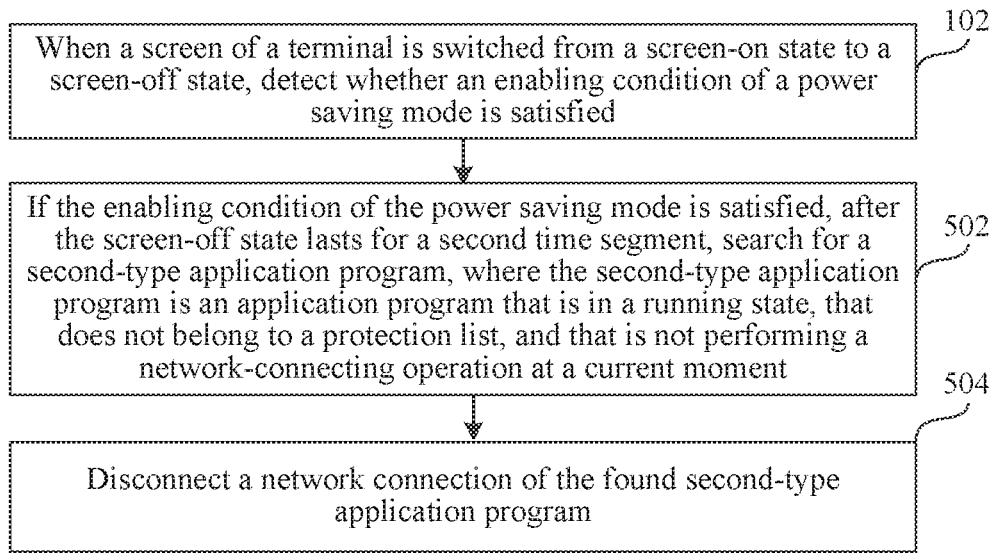
FIG. 5 is a flowchart of a terminal control method according to another embodiment of the present invention.

In another possible embodiment, step 104b in the embodiment shown in FIG. 2 may be replaced with step 502 and step 504, as shown in FIG. 5:

Step 502: After the screen-off state lasts for a second time period, search for a second-type application program, where the second-type application program is an application program that is in a running state and that is not performing a network-connecting operation at a current moment.

Usually, a time length of the second time period is greater than that of the first time period. For example, the second time period is five minutes.

In this embodiment, if an application program is not performing a network-connecting operation at a moment corresponding to five minutes after a screen is turned off, it is considered that the application program is an application program that needs to maintain a running state but does not need a network connection after the screen is turned off. After the screen-off state lasts for five minutes, a terminal finds these application programs as second-type application programs.

Optionally, the second-type application program is also an application program that does not belong to a protection list.

For example, if an application program A does not belong to the protection list, but the application program A has performed data synchronization within one minute after the screen is turned off, the terminal does not stop the application program A after the screen is turned off for one minute. If the application program A finishes data synchronization within three minutes after the screen is turned off, and the terminal detects that the application program A is no longer connected to the network when the screen is turned off for five minutes, the terminal uses the application program A as the second-type application program.

Step 504: Disconnect a network connection of the found second-type application program.

The terminal disconnects a network connection of the found second-type application program.

In conclusion, compared with that all application programs that do not belong to a protection list are used as second-type application programs, in this embodiment, an application program that is not performing a network-connecting operation at a current moment corresponding to a second time period is used as a second-type application program, so that a network connection of an application program that finishes an effective operation such as data synchronization and data backup after a screen is turned off may be properly disconnected, so as to reduce an amount of electricity consumed when these application programs receive and send radio signals in a background running process when a network does not need to be connected.

Figure 6:
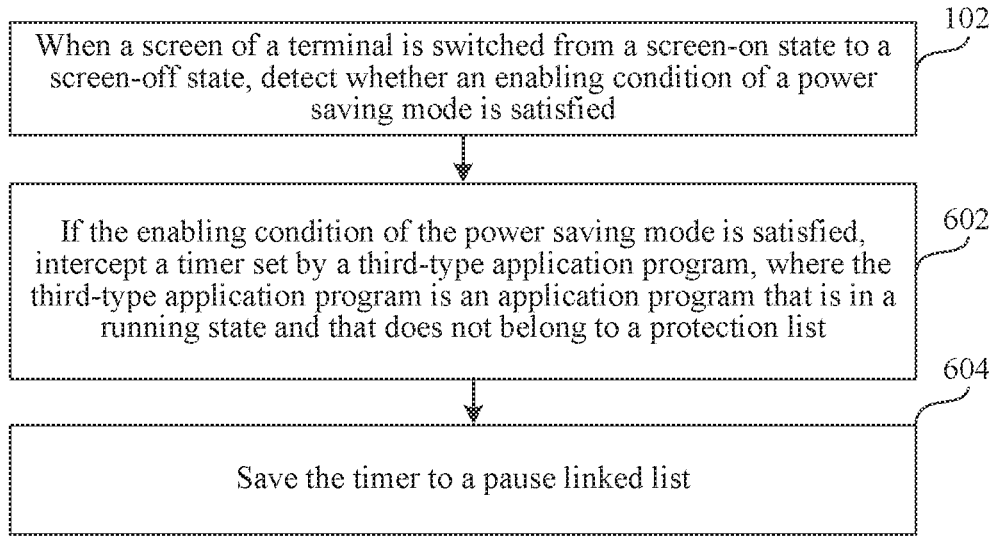
FIG. 6 is a flowchart of a terminal control method according to another embodiment of the present invention.

In another possible embodiment, step 104c in the embodiment shown in FIG. 2 may be replaced with step 602 and step 604, as shown in FIG. 6:

Step 602: Intercept a timer set by a third-type application program, where the third-type application program is an application program that is in a running state.

An application program often applies for a timer from an operating system, so as to set a timed task, for example, a task of periodically sending a heartbeat signal to a server, a task of periodically detecting version update from a server, or a task of periodically requesting data from a server. In a screen-off state, to save power, these timed tasks may not have to be run. Therefore, in a power saving mode, a terminal intercepts the timer set by the third-type application program. The third-type application program is an application program that is in a running state after a screen is turned off.

Optionally, the third-type application program is also an application program that does not belong to a protection list.

Step 604: Save the timer to a pause linked list.

The intercepted timer is further saved to the pause linked list, and the pause linked list is used to temporarily store a paused timer.

In conclusion, according to the terminal control method provided in this embodiment, a timer set by a third-type application program is intercepted and temporarily stored, so that power consumption that is caused by a timed task set by an application program can be reduced.

Figure 7:
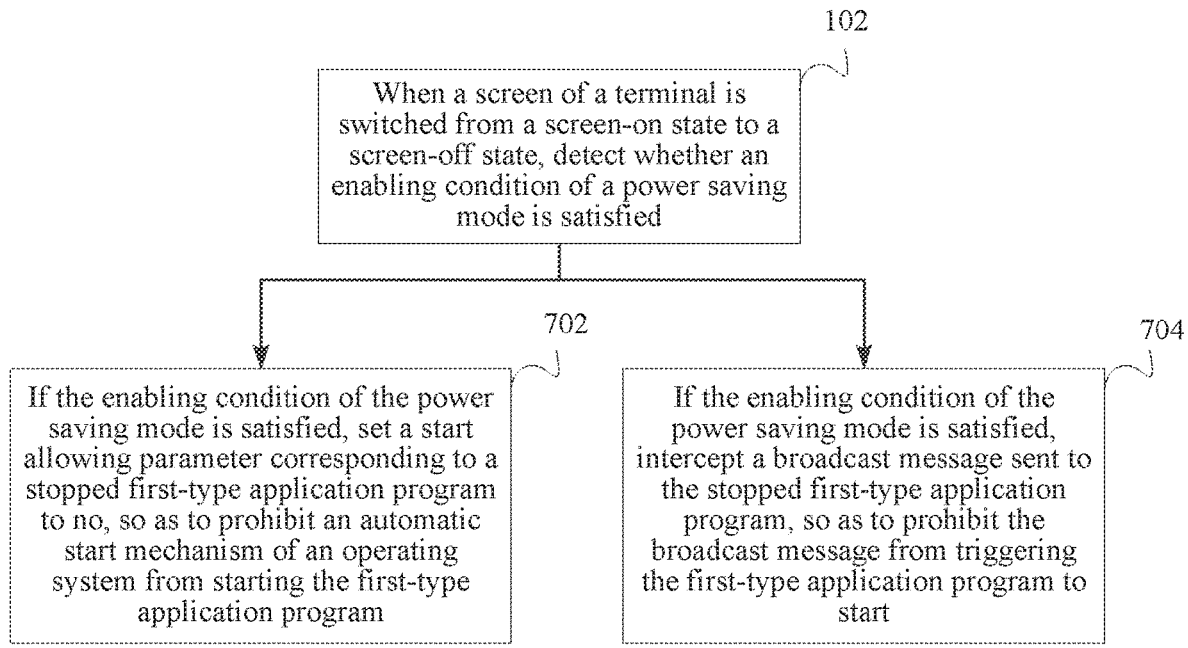
FIG. 7 is a flowchart of a terminal control method according to another embodiment of the present invention.

In another possible embodiment, step 104e in the embodiment shown in FIG. 2 may be replaced with step 702 and step 704, as shown in FIG. 7:

Step 702: Set an allowRestart parameter corresponding to a stopped first-type application program to no, so as to prohibit an automatic start mechanism of an operating system from starting the first-type application program.

To improve user experience, some operating systems automatically enable some application programs that are stopped or that are not started to run in a background, so that a user may obtain a faster response speed when the user uses these application programs.

To prevent the automatic start mechanism of the operating system from restarting the stopped first-type application program, in a power saving mode, a terminal sets the allowRestart parameter corresponding to the stopped first-type application program to no. An application program whose allowRestart parameter is no is ignored by the automatic start mechanism of the operating system.

Step 704: Intercept a broadcast message sent to the stopped first-type application program, so as to prohibit the broadcast message from triggering the first-type application program to start.

In some operating systems, inter-application invoking may be implemented by using the broadcast message between different application programs, or invoking between an operating system and an application program may be implemented by using the broadcast message.

For example, in an Android operating system, a service application A needs to send a broadcast message "Dial 186xxxxxxxx". If the service application A expects a phone application B to respond to the broadcast message, the service application A designates, in the broadcast message, that a receiving party is the phone application B. After receiving the broadcast message, the Android operating system starts the phone application B and hands over the broadcast message to the phone application B for processing.

To prevent the broadcast message from triggering the first-type application program to start, in the power saving mode, the terminal intercepts the broadcast message sent to the stopped first-type application program.

In conclusion, according to the terminal control method provided in this embodiment, power consumption that occurs when a stopped first-type application program is inappropriately started is reduced.

Figure 8:
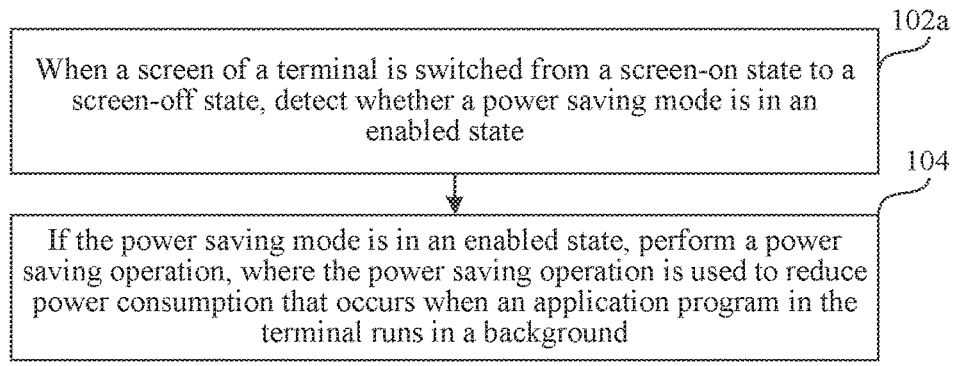
FIG. 8 is a flowchart of a terminal control method according to another embodiment of the present invention.

In another possible embodiment, step 102 in the foregoing embodiments may be replaced with step 102a, as shown in FIG. 8:

Step 102a: When a screen of a terminal is switched from a screen-on state to a screen-off state, detect whether a power saving mode is in an enabled state.

A user may determine whether to enable the power saving mode for the screen-off state.

That is, the terminal may provide a setting option corresponding to the power saving mode. When the setting option is active, the power saving mode is enabled. When the setting option is inactive, the power saving mode is not enabled.

When the screen of the terminal is switched from the screen-on state to the screen-off state, the terminal detects whether the power saving mode is in an enabled state.

Figure 9:
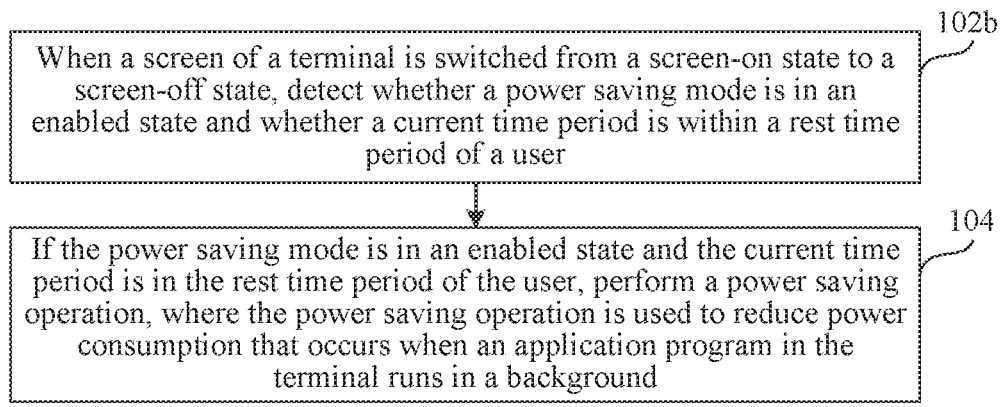
FIG. 9 is a flowchart of a terminal control method according to another embodiment of the present invention.

In another possible embodiment, step 102 in the foregoing embodiments may be replaced with step 102b, as shown in FIG. 9:

Step 102b: When a screen of a terminal is switched from a screen-on state to a screen-off state, detect whether a power saving mode is in an enabled state and whether a current time period is within a rest time period of a user.

The terminal may enable the power saving mode only within the reset time period of the user, for example, 10:00 p.m. to 6:00 a.m., a time period in which the user is in a sleeping state, and for another example, 1:00 p.m. to 2:00 p.m., a time period in which the user in is a noon break state.

Figure 10:
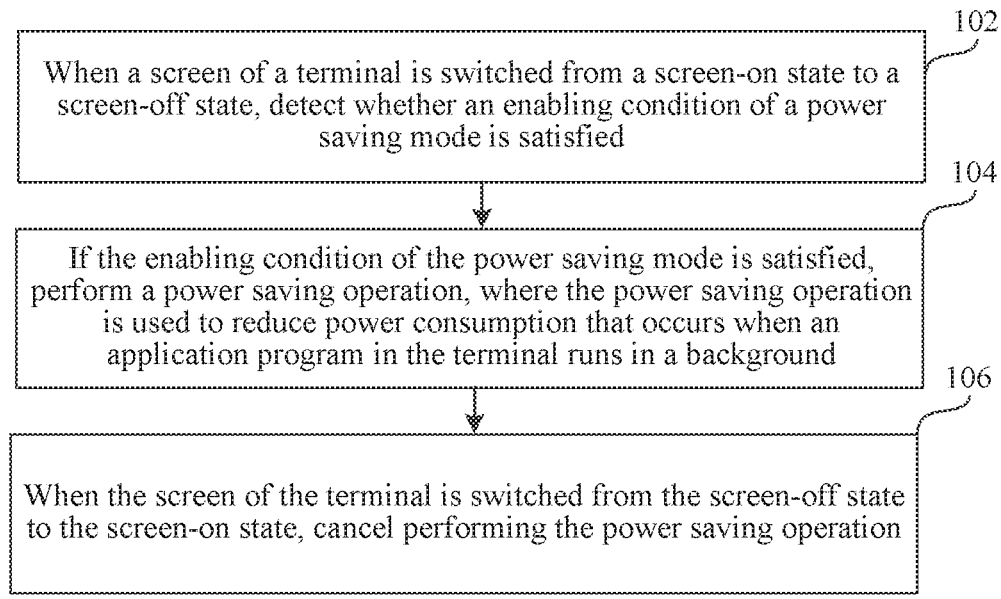
FIG. 10 is a flowchart of a terminal control method according to another embodiment of the present invention.

In still another possible embodiment, after step 104 in the foregoing embodiments, step 106 is further included, as shown in FIG. 10:

Step 106: When the screen of the terminal is switched from the screen-off state to the screen-on state, cancel performing the power saving operation.

The canceling performing the power saving operation includes at least one of the following cancelation operations:
no longer stopping the first-type application program;
restoring the network connection of the second-type application program;
canceling pausing of the timer of the third-type application program, that is, restoring the timer in the pause linked list to a normal timing state;
no longer prohibiting automatic start of the stopped first-type application program; or
switching from the target network switching mode to the initial network switching mode.

It should be noted that the foregoing cancelation operations correspond to the power saving operations in step 104 one by one. After at least one power saving operation is performed in step 104, a corresponding cancelation operation is performed in step 106.

In conclusion, in this embodiment, after a screen of a terminal is switched from a screen-off state to a screen-on state, the terminal is restored to a normal use state, so that a user normally uses the terminal.

A person skilled in the art may flexibly combine the foregoing possible embodiments, to obtain another possible embodiment. In an example of this embodiment, the following embodiment in which a terminal is a smartphone, an operating system is an Android operating system, a power saving operation includes all the foregoing power saving operations is provided.

Figure 11:
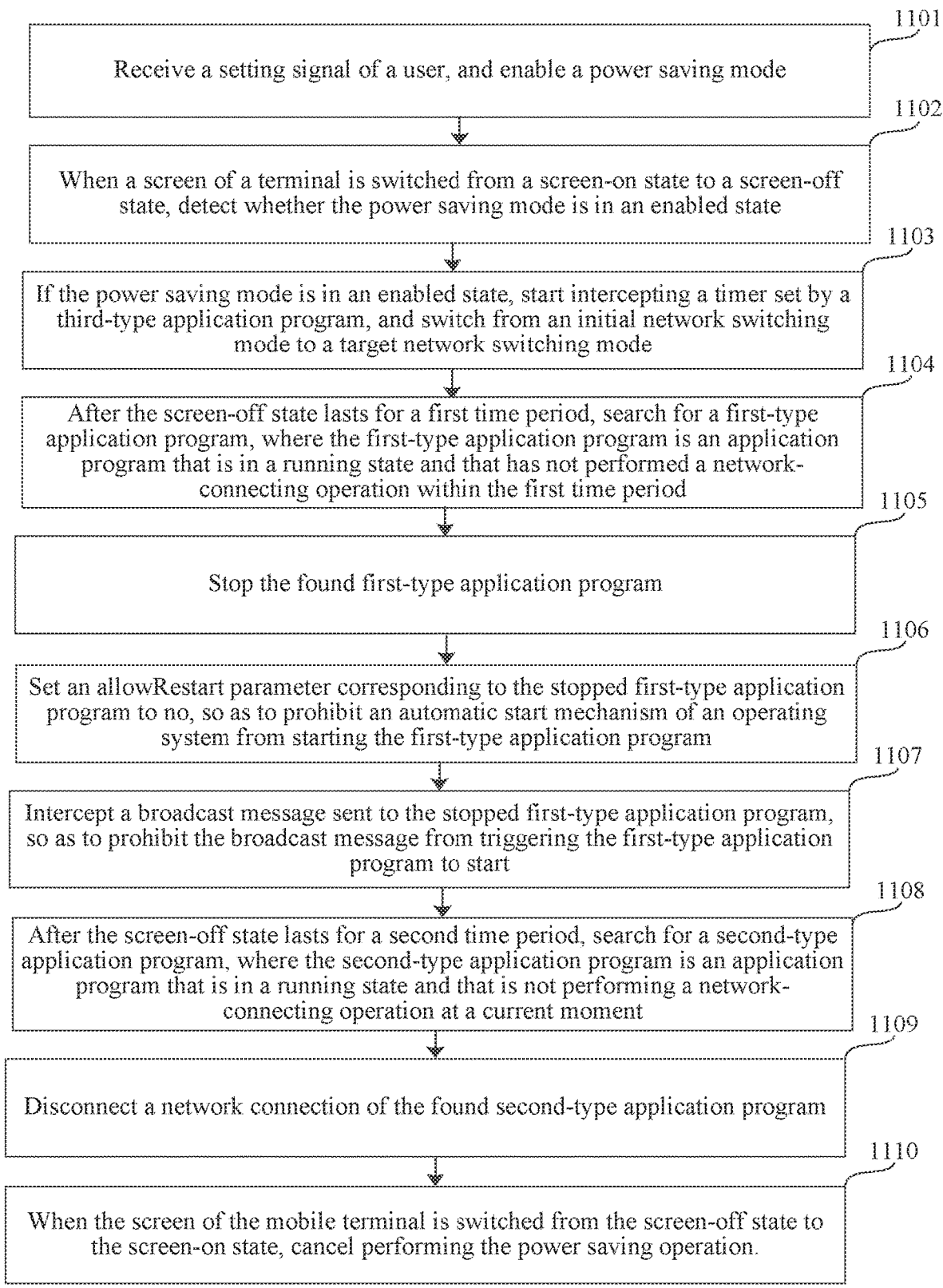
FIG. 11 is a flowchart of a terminal control method according to another embodiment of the present invention.

Referring to FIG. 11, FIG. 11 is a flowchart of a terminal control method according to another embodiment of the present invention. The method includes:

Step 1101: Receive a setting signal of a user, and enable a power saving mode.

A terminal provides a setting option corresponding to the power saving mode. When the setting option is active, the power saving mode is enabled. When the setting option is inactive, the power saving mode is not enabled.

Figure 12:
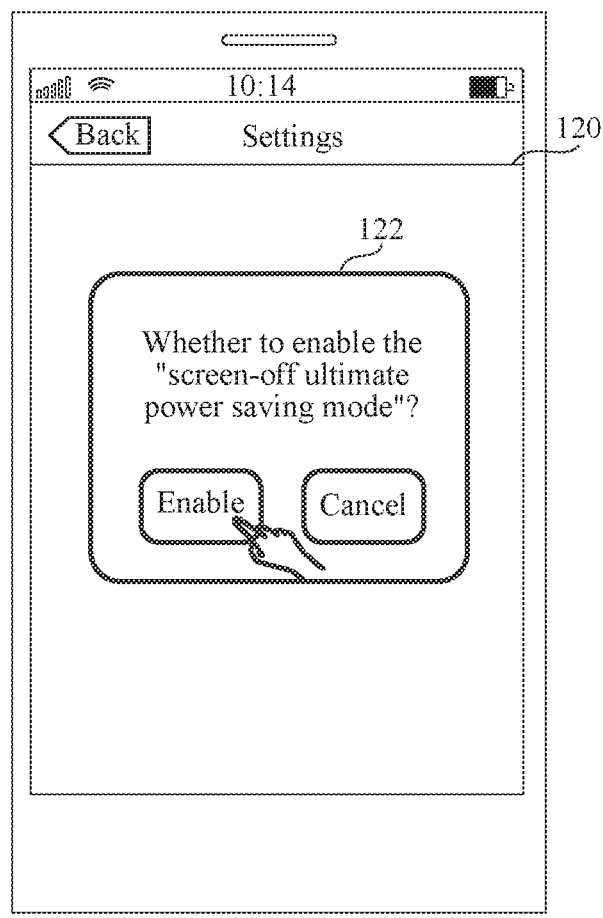
FIG. 12 is a schematic diagram of an interface used in the terminal control method provided in the embodiment shown in FIG. 11.

As shown in FIG. 12, the user enables a "screen-off ultimate power saving mode" by clicking a control 122 on a user interface 120.

Step 1102: When a screen of a terminal is switched from a screen-on state to a screen-off state, detect whether the power saving mode is in an enabled state.

When the screen is switched from the screen-on state to the screen-off state, a control integrated circuit of the screen sends a first signal to a processor in the terminal. After receiving the first signal, the processor detects whether the power saving mode is in an enabled state.

Step 1103: If the power saving mode is in an enabled state, start intercepting a timer set by a third-type application program, and switch from an initial network switching mode to a target network switching mode.

If the power saving mode is in an enabled state, the terminal starts performing a power saving operation in the power saving mode.

On one hand, the terminal starts intercepting the timer set by the third-type application program, to prevent the application program from setting a timed task such as a heartbeat signal and version update. The third-type application program is an application program that is in a running state after the screen is turned off. Optionally, the third-type application program is also an application program that does not belong to a protection list.

For example, when an Android operating system is used, the terminal intercepts, at a framework timer setting interface, timers set by various application programs. For timers set by application programs that do not belong to the protection list, a smartphone pauses the timers set by these application programs and does not perform processing, and saves the timers to a pause linked list.

On the other hand, the terminal switches from the initial network switching mode to the target network switching mode.

For example, when an Android operating system is used, a radio interface layer daemon (Radio Interface Layer Daemon, RILD for short) in the terminal sends a corresponding instruction in an AT (Attention) instruction set to a phone module (Modem), to enable the phone module to enter a network switching mode in which only a 2G network and a 3G network are included from a network switching mode in which a 2G network, a 3G network, and a 4G network are included.

Step 1104: After the screen-off state lasts for a first time period, search for a first-type application program, where the first-type application program is an application program that is in a running state and that has not performed a network-connecting operation within the first time period.

Optionally, the first-type application program is also an application program that does not belong to a protection list.

For example, after the screen-off state lasts for one minute, the terminal searches for the first-type application program. The first-type application program is an application program that is in a running state, that does not belong to the protection list, and that has not performed the network-connecting operation within one minute.

Step 1105: Stop the found first-type application program.

For example, when an Android operating system is used, the terminal invokes a forceStopPackage ( ) method to stop a process of the first-type application program.

Step 1106: Set an allowRestart parameter corresponding to the stopped first-type application program to no, so as to prohibit an automatic start mechanism of an operating system from starting the first-type application program.

For example, when an Android operating system is used, the terminal sets the allowRestart parameter of the stopped first-type application program to "not allow automatic start of the application program".

Step 1107: Intercept a broadcast message sent to the stopped first-type application program, so as to prohibit the broadcast message from triggering the first-type application program to start.

The terminal also intercepts a broadcast message sent by another application program or an operating system to the stopped first-type application program, so as to prohibit the broadcast message from triggering the first-type application program to start.

An execution order of step 1106 and step 1107 is not limited in this embodiment.

Step 1108: After the screen-off state lasts for a second time period, search for a second-type application program, where the second-type application program is an application program that is in a running state and that is not performing a network-connecting operation at a current moment.

Optionally, the second-type application program is also an application program that does not belong to a protection list.

For example, after the screen-off state lasts for five minutes, the terminal searches for the second-type application program. The second-type application program is an application program that is in a running state, that does not belong to the protection list, and that is not performing a network-connecting operation at the current moment.

Step 1109: Disconnect a network connection of the found second-type application program.

Step 1110: When the screen of the terminal is switched from the screen-off state to the screen-on state, cancel performing the power saving operation.

When the screen is switched from the screen-off state to the screen-on state, a control integrated circuit of the screen sends a second signal to the processor in the terminal. After receiving the second signal, the processor cancels performing the power saving operation in the power saving mode.

The canceling performing the power saving operation includes at least one of the following cancelation operations:

no longer stopping the first-type application program;

restoring the network connection of the second-type application program;

canceling pausing of the timer of the third-type application program, that is, restoring the timer in the pause linked list to a normal timing state;

no longer prohibiting automatic start of the stopped first-type application program; or switching from the target network switching mode to the initial network switching mode.

It should be noted that the cancelation operation performed in step 1110 corresponds to the power saving operation performed in the foregoing step.

In conclusion, according to the terminal control method provided in this embodiment, when a screen of a terminal is switched from a screen-on state to a screen-off state, a power saving operation is performed, so as to reduce power consumption that occurs when an application program in the terminal runs in a background, thereby resolving that in a current power saving mode, a power saving policy is mainly turning down brightness of a screen or turning off a screen in time, but these power saving modes cannot alleviate a power consumption problem that occurs after the screen of the terminal is turned off. Therefore, power consumption in the screen-off state is reduced as much as possible without affecting normal use of a user.

Tests show that within a night rest time period of a user, a smartphone that enables the power saving mode saves 50% power as compared with a smartphone that does not enable the power saving mode. A standby time of the smartphone is greatly increased.

Apparatus embodiments of the present invention are as follows. For details not described in the apparatus embodiments, refer to the foregoing corresponding method embodiments.

Figure 13:
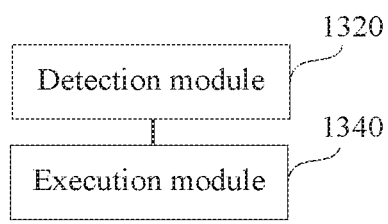
FIG. 13 is a structural block diagram of a terminal control apparatus according to an embodiment of the present invention.

Referring to FIG. 13, FIG. 13 is a structural block diagram of a terminal control apparatus according to an embodiment of the present invention. The terminal control apparatus may be implemented to be all or a part of a terminal by using software, hardware, or a combination of software and hardware. The terminal control apparatus includes:

a detection module 1320, configured to: when a screen of a terminal is switched from a screen-on state to a screen-off state, detect whether an enabling condition of a power saving mode is satisfied; and an execution module 1340, configured to: if a detection result of the detection module 1320 is that the enabling condition of the power saving mode is satisfied, perform a power saving operation. The power saving operation is used to reduce power consumption that occurs when an application program in the terminal runs in a background.

In conclusion, according to the terminal control apparatus provided in this embodiment, when a screen of a terminal is in a screen-off state, a power saving operation is performed, so as to reduce power consumption that occurs when an application program in the terminal runs in a background, thereby resolving that in a current power saving mode, a power saving policy is mainly turning down brightness of a screen or turning off a screen in time, but these power saving modes cannot alleviate a power consumption problem that occurs after the screen of the terminal is turned off. Therefore, power consumption in the screen-off state is reduced as much as possible without affecting normal use of a user.

Figure 14:
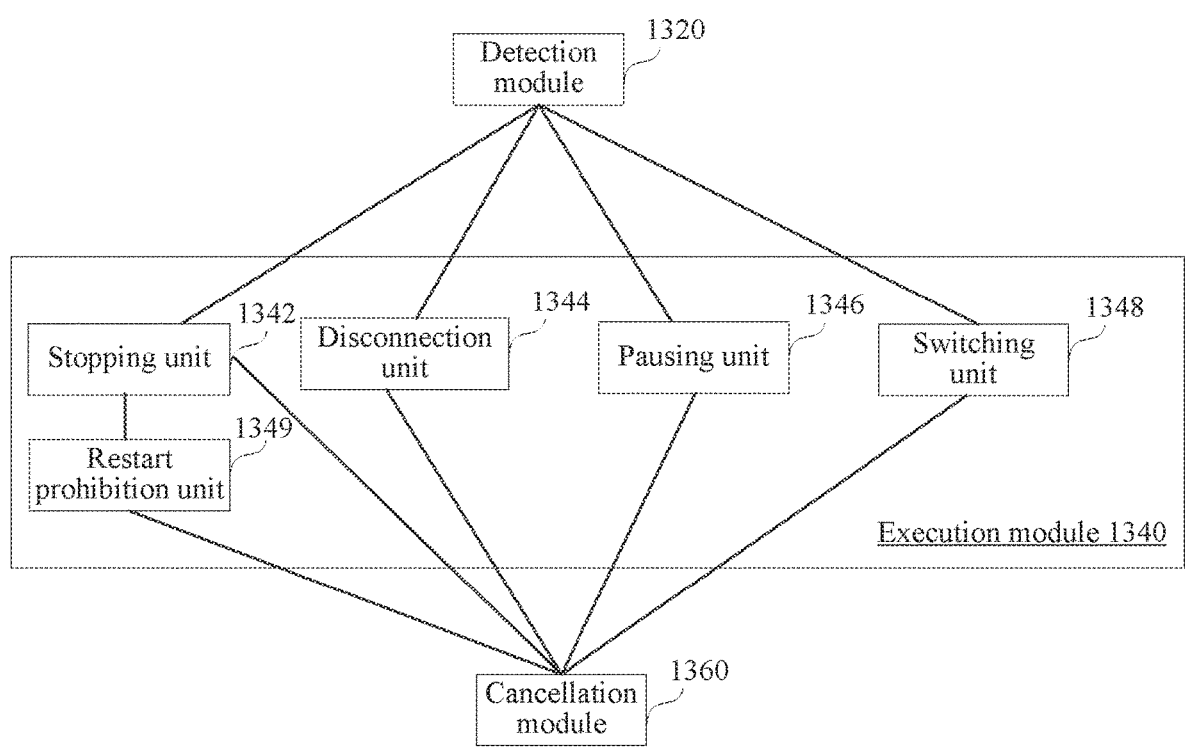
FIG. 14 is a structural block diagram of a terminal control apparatus according to another embodiment of the present invention.

Referring to FIG. 14, FIG. 14 is a structural block diagram of a terminal control apparatus according to another embodiment of the present invention. The terminal control apparatus may be implemented to be all or a part of a terminal by using software, hardware, or a combination of software and hardware. The terminal control apparatus includes:

a detection module 1320, configured to: when a screen of a terminal is switched from a screen-on state to a screen-off state, detect whether an enabling condition of a power saving mode is satisfied; and an execution module 1340, configured to: if a detection result of the detection module 1320 is that the enabling condition of the power saving mode is satisfied, perform a power saving operation, where the power saving operation is used to reduce power consumption that occurs when an application program in the terminal runs in a background.

Optionally, the execution module 1340 includes at least one of the following units:

a stopping unit 1342, configured to stop a first-type application program;

a disconnection unit 1344, configured to disconnect a network connection of a second-type application program;

a pausing unit 1346, configured to pause a timer of a third-type application program; or a switching unit 1348, configured to switch from an initial network switching mode to a target network switching mode, where a network mode used in the target network switching mode does not include a network mode in which signal quality is lower than expected quality.

Optionally, the execution module 1340 further includes:

a restart prohibition unit 1349, configured to prohibit automatic start of the stopped first-type application program.

Optionally, the stopping unit 1342 is specifically configured to: after the screen-off state lasts for a first time period, search for the first-type application program. The first-type application program is an application program that is in a running state and that has not performed a network-connecting operation within the first time period; and stop the found first-type application program.

Optionally, the disconnection unit 1344 is specifically configured to: after the screen-off state lasts for a second time period, search for the second-type application program. The second-type application program is an application program that is in a running state and that is not performing a network-connecting operation at a current moment; and disconnect the network connection of the found second-type application program.

Optionally, the pausing unit 1346 is specifically configured to: intercept the timer set by the third-type application program. The third-type application program is an application program that is in a running state; and save the timer to a pause linked list.

Optionally, the restart prohibition unit 1349 is specifically configured to: set an allowRestart parameter corresponding to the stopped first-type application program to no, so as to prohibit an automatic start mechanism of an operating system from starting the first-type application program; and/or intercept a broadcast message sent to the stopped first-type application program, so as to prohibit the broadcast message from triggering the first-type application program to start.

Optionally, the first-type application program is an application program that does not belong to a protection list;

the second-type application program is an application program that does not belong to the protection list; and the third-type application program is an application program that does not belong to the protection list.

In a possible implementation manner, the detection module is configured to: when the screen of the terminal is switched from the screen-on state to the screen-off state, detect whether the power saving mode is in an enabled state.

In another possible implementation manner, the detection module is configured to: when the screen of the terminal is switched from the screen-on state to the screen-off state, detect whether the power saving mode is in an enabled state and whether a current time period is within a rest time period of a user.

Optionally, the apparatus further includes:

a cancelation module 160, configured to: when the screen of the terminal is switched from the screen-off state to the screen-on state, cancel performing the power saving operation in the power saving mode.

The canceling performing the power saving operation includes at least one of the following cancelation operations:

no longer stopping the first-type application program;

restoring the network connection of the second-type application program;

canceling pausing of the timer of the third-type application program, that is, restoring the timer in the pause linked list to a normal timing state;

no longer prohibiting automatic start of the stopped first-type application program; or switching from the target network switching mode to the initial network switching mode.

Figure 15:
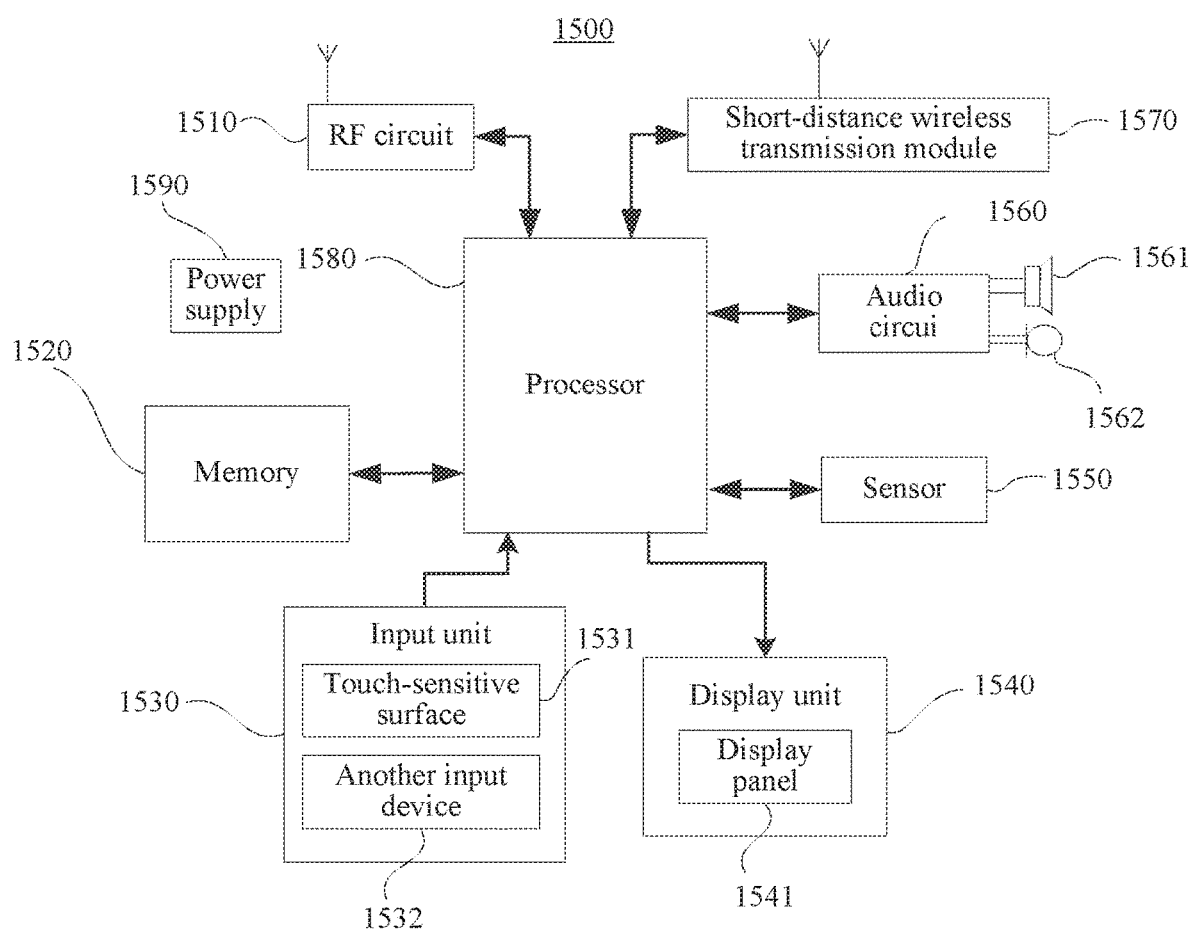
FIG. 15 is a structural block diagram of a terminal according to an embodiment of the present invention.

Referring to FIG. 15, FIG. 15 is a schematic structural diagram of a terminal according to an embodiment of the present invention. A terminal 1500 may include components such as an RF (Radio Frequency, radio frequency) circuit 1510, a memory 1520 including one or more computer readable storage media, an input unit 1530, a display unit 1540, a sensor 1550, an audio circuit 1560, a short-distance wireless transmission module 1570, a processor 1580 including one or more processing cores, and a power supply 1590. A person skilled in the art may understand that a terminal structure shown in FIG. 15 constitutes no limitation to the terminal, and the terminal may include more or fewer components than those shown in the figure, or some components may be combined, or a different component deployment may be used.

The RF circuit 1510 may be configured to receive and send signals during an information receiving and sending process or a call process, particularly, after receiving downlink information of abase station, deliver the downlink information of the base station to one or more processors 1580 for processing, and in addition, send related uplink data to the base station. Generally, the RF circuit 1510 includes, but is not limited to, an antenna, at least one amplifier, a tuner, one or more oscillators, a subscriber identity module (SIM) card, a transceiver, a coupler, an LNA (Low Noise Amplifier, low noise amplifier), a duplexer, and the like. In addition, the RF circuit 1510 may also communicate with a network and another device by means of wireless communication. The wireless communication may use any communications standard or protocol, including but not limited to: GSM (Global System for Mobile communication), GPRS (General Packet Radio Service), CDMA (Code Division Multiple Access), WCDMA (Wideband Code Division Multiple Access), LTE (Long Term Evolution), e-mail, and SMS (Short Messaging Service). The memory 1520 may be configured to store a software program or a module. For example, the memory 1520 may be configured to store a protection list or the like of an application program. The processor 1580 runs the software program and the module that are stored in the memory 1520, to implement various functional applications and data processing. The memory 1520 may mainly include a program storage area and a data storage area. The program storage area may store an operating system, an application program required by at least one function, and the like; and the data storage area may store data created according to use of the terminal 1500 or the like. In addition, the memory 1520 may include a high-speed random access memory, and may further include a non-volatile memory such as at least one disk storage component, a flash memory component, or another volatile solid-state storage component. Correspondingly, the memory 1520 may further include a memory controller, so as to control access of the processor 1580 and the input unit 1530 to the memory 1520. The input unit 1530 may be configured to: receive input figure information or character information, and generate a keyboard, mouse, joystick, optical, or trackball signal input related to a user setting and function control. Specifically, the input unit 1530 may include a touch-sensitive surface 1531 and another input device 1532. The touch-sensitive surface 1531, which may also be referred to as a touch display screen or a touch panel, may collect a touch operation of a user on or near the touch-sensitive surface (such as an operation of a user on or near the touch-sensitive surface 1531 by using any suitable object or attachment, such as a finger or a touch pen), and drive a corresponding connection apparatus according to a preset program. Optionally, the touch-sensitive surface 1531 may include two parts: a touch detection apparatus and a touch controller. The touch detection apparatus detects a touch location of the user, detects a signal generated by the touch operation, and transfers the signal to the touch controller. The touch controller receives touch information from the touch detection apparatus, converts the touch information into touch point coordinates, and then sends the touch point coordinates to the processor 1580. Moreover, the touch controller can receive and perform a command sent by the processor 1580. In addition, the touch-sensitive surface 1531 may be a resistive, capacitive, infrared, or surface sound wave type touch-sensitive surface. In addition to the touch-sensitive surface 1531, the input unit 1530 may further include the other input device 1532. Specifically, the another input device 1532 may include, but is not limited to, one or more of a physical keyboard, a functional key (such as a volume control key or a switch key), a trackball, a mouse, or a joystick.

The display unit 1540 may be configured to display information entered by the user or information provided for the user, and various graphical user interfaces of the terminal 1500. These graphical user interfaces may be formed by a graph, a text, an icon, a video, or any combination thereof. The display unit 1540 may include a display panel 1541. Optionally, the display panel 1541 may be configured by using an LCD (Liquid Crystal Display, liquid crystal display), an OLED (Organic Light-Emitting Diode, organic light-emitting diode), or the like. Further, the touch-sensitive surface 1531 may cover the display panel 1541. After detecting a touch operation on or near the touch-sensitive surface 1531, the touch-sensitive surface 1531 transfers the touch operation to the processor 1580, so as to determine a type of a touch event. Then, the processor 1580 provides a corresponding visual output on the display panel 1541 according to the type of the touch event. Although, in FIG. 15, the touch-sensitive surface 1531 and the display panel 1541 are used as two separate components to implement an input function and an output function, in some embodiments, the touch-sensitive surface 1531 and the display panel 1541 may be integrated to implement the input function and the output function.

The terminal 1500 may further include at least one sensor 1550, for example, an optical sensor, a motion sensor and other sensors. Specifically, the optical sensor may include an ambient light sensor and a proximity sensor. The ambient light sensor may adjust brightness of the display panel 1541 according to luminance of the ambient light, and the proximity sensor may switch off the display panel 1541 and/or backlight when the terminal 1500 is moved to the ear. As one type of motion sensor, a gravity acceleration sensor may detect magnitudes of accelerations in various directions (generally on three axes), may detect a magnitude and a direction of the gravity when static, and may be configured to identify an application of a mobile phone gesture (such as switchover between a horizontal screen and a vertical screen, a related game, and gesture calibration of a magnetometer), a function related to vibration recognition (such as a pedometer and a knock), and the like. Other sensors, such as a gyroscope, a barometer, a hygrometer, a thermometer, and an infrared sensor, which may be configured in the terminal 1500 are not further described herein.

The audio circuit 1560, a speaker 1561, and a microphone 1562 may provide an audio interface between the user and the terminal 1500. The audio circuit 1560 may convert received audio data into an electric signal and transmit the electric signal to the speaker 1561. The speaker 1561 converts the electric signal into a sound signal for output. On the other hand, the microphone 1562 converts a collected sound signal into an electric signal. The audio circuit 1560 receives the electric signal and converts the electric signal into audio data, and outputs the audio data to the processor 1580 for processing. Then, the processor 1580 sends the audio data to another apparatus by using the RF circuit 1510, or outputs the audio data to the memory 1520 for further processing. The audio circuit 1560 may further include an earplug jack, to provide communication between a peripheral earphone and the terminal 1500.

The short-distance wireless transmission module 1570 may be a WiFi (wireless fidelity, wireless fidelity) module, a Bluetooth module, or the like. The terminal 1500 may help, by using the short-distance wireless transmission module 1570, the user to receive and send an e-mail, browse a webpage, access streaming media, and the like. The terminal 1500 provides wireless broadband Internet access to the user. Although the short-distance wireless transmission module 1570 is shown in FIG. 15, it may be understood that the short-distance wireless transmission module 1570 is not an essential part of the terminal 1500 and may be omitted as required as long as the essence of the present invention is not changed.

The processor 1580 is the control center of the terminal 1500, and is connected to various parts of the entire terminal by using various interfaces and wires. By running or performing the software program and/or module stored in the memory 1520, and invoking data stored in the memory 1520, the processor 1580 performs various functions and data processing of the terminal 1500, thereby performing overall monitoring on the terminal. Optionally, the processor 1580 may include one or more processing cores. Optionally, the processor 1580 may integrate an application processor and a modem processor. The application processor mainly processes an operating system, a user interface, an application program, and the like. The modem processor mainly processes wireless communication. It may be understood that the foregoing modem processor may not be integrated into the processor 1580.

The terminal 1500 further includes the power supply 1590 (for example, a battery) that supplies power to various components. Preferably, the power supply may be logically connected to the processor 1580 by using a power management system, so as to implement a function such as charging, discharging, and power consumption management by using the power management system. The power supply 1590 may further include one or more direct current or alternate current power supplies, one or more re-charging systems, one or more power supply fault detection circuits, one or more power supply converters or inverters, one or more power supply state indicators, or any other components.

Although not shown in the figure, the terminal 1500 may further include a camera, a Bluetooth module, and the like, and details are not described herein.

The terminal 1500 further includes a memory and one or more programs. The one or more programs are stored in the memory, and the foregoing method embodiments are configured to be performed by one or more processors. That is, the processor is configured to: when a screen is switched from a screen-on state to a screen-off state, detect whether an enabling condition of a power saving mode is satisfied; and the processor is further configured to: if the enabling condition of the power saving mode is satisfied, perform a power saving operation, where the power saving operation is used to reduce power consumption that occurs when an application program in the terminal runs in a background.

Optionally, when performing the power saving operation, the processor is specifically configured to perform at least one of the following operations:

stopping a first-type application program;

disconnecting a network connection of a second-type application program;

pausing a timer of a third-type application program; or switching from an initial network switching mode to a target network switching mode, where a network mode used in the target network switching mode does not include a network mode in which signal quality is lower than expected quality.

Optionally, the processor is further configured to: after stopping the first-type application program, prohibit automatic start of the stopped first-type application program.

Optionally, when stopping the first-type application program, the processor is specifically configured to: after the screen-off state lasts for a first time period, search for the first-type application program. The first-type application program is an application program that is in a running state and that has not performed a network-connecting operation within the first time period; and stop the found first-type application program.

Optionally, when disconnecting the data network connection of the second-type application program, the processor is specifically configured to: after the screen-off state lasts for a second time period, search for the second-type application program. The second-type application program is an application program that is in a running state and that is not performing a network-connecting operation at a current moment; and disconnect the network connection of the found second-type application program.

Optionally, when pausing the timer of the third-type application program, the processor is specifically configured to: intercept the timer set by the third-type application program. The third-type application program is an application program that is in a running state; and save the timer to a pause linked list.

Optionally, when prohibiting the automatic start of the stopped first-type application program, the processor is specifically configured to: set an allowRestart parameter corresponding to the stopped first-type application program to no, so as to prohibit an automatic start mechanism of an operating system from starting the first-type application program; and/or intercept a broadcast message sent to the stopped first-type application program, so as to prohibit the broadcast message from triggering the first-type application program to start.

Optionally, the first-type application program is an application program that does not belong to a protection list;

the second-type application program is an application program that does not belong to the protection list; and the third-type application program is an application program that does not belong to the protection list.

Optionally, when the screen of the terminal is switched from the screen-on state to the screen-off state and the processor detects whether the enabling condition of the power saving mode is satisfied, the processor is specifically configured to:

when the screen of the terminal is switched from the screen-on state to the screen-off state, detect whether the power saving mode is in an enabled state; or when the screen of the terminal is switched from the screen-on state to the screen-off state, detect whether the power saving mode is in an enabled state and whether a current time period is within a rest time period of a user.

Optionally, after performing the power saving operation, the processor is further configured to: when the screen of the terminal is switched from the screen-off state to the screen-on state, cancel performing the power saving operation.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely example embodiments of the present invention, but are not intended to limit the present invention. Any modification, equivalent replacement, and improvement made without departing from the spirit and principle of the present invention shall fall within the protection scope of the present invention.

What is claimed is:

1. A terminal control method, comprising:
   detecting whether an enabling condition of a power saving mode is satisfied, when a screen of a terminal is switched from a screen-on state to a screen-off state; and
   performing a power saving operation, when the enabling condition of the power saving mode is satisfied, to reduce power consumption that occurs when an application program in the terminal runs in a background, wherein performing a power saving operation comprises stopping a first-type application program; and
after stopping the first-type application program, prohibiting automatic start of the stopped first-type application program, wherein prohibiting automatic start of the stopped first-type application program comprises intercepting a broadcast message sent to the stopped first-type application program to prohibit the broadcast message from triggering the first-type application program to start.

2. The method according to claim 1, wherein performing a power saving operation further comprises performing at least one of the following operations:
disconnecting a network connection of a second-type application program;
pausing a timer of a third-type application program; or
switching from an initial network switching mode to a target network switching mode, wherein a network mode used in the target network switching mode does not comprise a network mode in which signal quality is lower than expected quality.

3. The method according to claim 2, wherein disconnecting a network connection of a second-type application program comprises:
after the screen-off state lasts for a second time period, searching for the second-type application program, wherein the second-type application program is an application program that is in a running state and that is not performing a network-connecting operation at a current moment; and
disconnecting the network connection of the second-type application program.

4. The method according to claim 2, wherein pausing a timer of a third-type application program comprises:
intercepting the timer set by the third-type application program, wherein the third-type application program is an application program that is in a running state; and
saving the timer to a pause linked list.

5. The method according to claim 2, wherein
the first-type application program is an application program that does not belong to a protection list;
the second-type application program is an application program that does not belong to the protection list; and
the third-type application program is an application program that does not belong to the protection list.

6. The method according to claim 1, wherein stopping a first-type application program comprises:
after the screen-off state lasts for a first time period, searching for the first-type application program, wherein the first-type application program is an application program that is in a running state and that has not performed a network-connecting operation within the first time period; and
stopping the first-type application program.

7. The method according to claim 1, wherein prohibiting automatic start of the stopped first-type application program further comprises:
setting an allowRestart parameter corresponding to the stopped first-type application program to prohibit an automatic start mechanism of an operating system from starting the first-type application program.

8. The method according to claim 1, wherein detecting whether an enabling condition of a power saving mode is satisfied comprises:
detecting whether the power saving mode is in an enabled state, when the screen of the terminal is switched from the screen-on state to the screen-off state; or
detecting whether the power saving mode is in an enabled state and whether a current time period is within a rest time period of a user, when the screen of the terminal is switched from the screen-on state to the screen-off state.

9. The method according to claim 1, wherein after performing a power saving operation, the method further comprises:
canceling performing the power saving operation, when the screen of the terminal is switched from the screen-off state to the screen-on state.

10. A terminal, comprising:
a processor; and
a memory and a screen that are electrically connected to the processor, wherein the memory stores one or more instructions which, when executed by the processor, cause the terminal to:
detect whether an enabling condition of a power saving mode is satisfied, when the screen is switched from a screen-on state to a screen-off state, and
perform a power saving operation, when the enabling condition of the power saving mode is satisfied, to reduce power consumption that occurs when an application program in the terminal runs in a background, wherein performing a power saving operation comprises stopping a first-type application program; and
after stopping the first-type application program, prohibit automatic start of the stopped first-type application program, wherein prohibiting automatic start of the stopped first-type application program comprises intercepting a broadcast message sent to the stopped first-type application program to prohibit the broadcast message from triggering the first-type application program to start.

11. The terminal according to claim 10, wherein to perform the power saving operation, the one or more instructions, when executed by the processor, further cause the terminal to:
disconnect a network connection of a second-type application program;
pause a timer of a third-type application program; or
switch from an initial network switching mode to a target network switching mode, wherein a network mode used in the target network switching mode does not comprise a network mode in which signal quality is lower than expected quality.

12. The terminal according to claim 10, wherein the one or more instructions, when executed by the processor, further cause the terminal to:
after the screen-off state lasts for a first time period, search for the first-type application program, wherein the first-type application program is an application program that is in a running state and that has not performed a network-connecting operation within the first time period; and
stop the first-type application program.

13. A non-transitory computer-readable storage medium comprising instructions which, when executed by a computer, cause the computer to:
detect whether an enabling condition of a power saving mode is satisfied, when a screen of a terminal is switched from a screen-on state to a screen-off state; and
perform a power saving operation, when the enabling condition of the power saving mode is satisfied, to reduce power consumption that occurs when an application program in the terminal runs in a background, wherein performing a power saving operation comprises stopping a first-type application program; and after stopping the first-type application program, prohibit automatic start of the stopped first-type application program, wherein prohibiting automatic start of the stopped first-type application program comprises intercepting a broadcast message sent to the stopped first-type application program to prohibit the broadcast message from triggering the first-type application program to start.

14. The non-transitory computer-readable storage medium according to claim 13, wherein performing a power saving operation further comprises performing at least one of the following operations:

disconnecting a network connection of a second-type application program;

pausing a timer of a third-type application program; or switching from an initial network switching mode to a target network switching mode, wherein a network mode used in the target network switching mode does not comprise a network mode in which signal quality is lower than expected quality.

15. The non-transitory computer-readable storage medium according to claim 14, wherein prohibiting automatic start of the stopped first-type application program further comprises:

setting an allowRestart parameter corresponding to the stopped first-type application program to prohibit an automatic start mechanism of an operating system from starting the first-type application program.

16. The non-transitory computer-readable storage medium according to claim 14, wherein disconnecting a network connection of a second-type application program comprises:

after the screen-off state lasts for a second time period, searching for the second-type application program, wherein the second-type application program is an application program that is in a running state and that is not performing a network-connecting operation at a current moment; and disconnecting the network connection of the second-type application program.

17. The non-transitory computer-readable storage medium according to claim 14, wherein pausing a timer of a third-type application program comprises:

intercepting the timer set by the third-type application program, wherein the third-type application program is an application program that is in a running state; and saving the timer to a pause linked list.

18. The non-transitory computer-readable storage medium according to claim 13, wherein stopping a first-type application program comprises:

after the screen-off state lasts for a first time period, searching for the first-type application program, wherein the first-type application program is an application program that is in a running state and that has not performed a network-connecting operation within the first time period; and stopping the first-type application program.

19. The non-transitory computer-readable storage medium according to claim 13, wherein detecting whether an enabling condition of a power saving mode is satisfied comprises:

detecting whether the power saving mode is in an enabled state, when the screen of the terminal is switched from the screen-on state to the screen-off state; or detecting whether the power saving mode is in an enabled state and whether a current time period is within a rest time period of a user, when the screen of the terminal is switched from the screen-on state to the screen-off state.

20. The non-transitory computer-readable storage medium according to claim 13, wherein the instructions which, when executed by the computer, cause the computer to:

cancel performing the power saving operation, when the screen of the terminal is switched from the screen-off state to the screen-on state.

* * * * *